United States Patent
Coleman et al.

(10) Patent No.: US 11,082,527 B2
(45) Date of Patent: Aug. 3, 2021

(54) CONTROLLING TRANSACTION REQUESTS BETWEEN APPLICATIONS AND SERVERS

(71) Applicant: INTERNATIONAL BUSINESS MACHINES CORPORATION, Armonk, NY (US)

(72) Inventors: Andrew John Coleman, Petersfield (GB); John Anthony Reeve, Winchester (GB); Trevor Clifford Dolby, Southampton (GB); Matthew E. Golby-Kirk, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/708,575

(22) Filed: Dec. 10, 2019

(65) Prior Publication Data

US 2021/0176333 A1 Jun. 10, 2021

(51) Int. Cl.
*G06F 15/16* (2006.01)
*H04L 29/08* (2006.01)
*G06F 16/21* (2019.01)

(52) U.S. Cl.
CPC ............ *H04L 67/32* (2013.01); *G06F 16/219* (2019.01); *H04L 67/10* (2013.01); *H04L 67/2809* (2013.01)

(58) Field of Classification Search
CPC ..... H04L 67/32; H04L 67/10; H04L 67/2809; G06F 16/219
USPC ........................................................ 709/219
See application file for complete search history.

(56) References Cited

U.S. PATENT DOCUMENTS

| | | | |
|---|---|---|---|
| 7,433,950 B2* | 10/2008 | Bird | G06F 16/252 709/225 |
| 7,933,948 B2* | 4/2011 | Bird | G06F 16/252 709/201 |
| 10,331,657 B1 | 6/2019 | Cole | |
| 10,810,165 B2* | 10/2020 | Cha | G06F 16/164 |
| 2005/0144276 A1* | 6/2005 | Bird | G06F 16/24532 709/225 |
| 2006/0184616 A1 | 8/2006 | Park | |
| 2008/0244017 A1 | 10/2008 | Gershinsky | |
| 2017/0220617 A1 | 8/2017 | Bortnikov et al. | |
| 2018/0101543 A1* | 4/2018 | Cha | G06F 16/13 |

(Continued)

FOREIGN PATENT DOCUMENTS

| | | |
|---|---|---|
| CN | 109493223 A | 3/2019 |
| NO | 2007113543 A1 | 10/2007 |
| NO | 2016196286 A1 | 12/2016 |

OTHER PUBLICATIONS

Geeksforgeeks, "Back-off Algorithm for CSMA/CD", printed Oct. 10, 2019, 14 pages, https://www.geeksforgeeks.org/back-off-algorithm-csmacd/.

(Continued)

*Primary Examiner* — Moustafa M Meky
(74) *Attorney, Agent, or Firm* — Robert D. Bean

(57) ABSTRACT

Concepts for controlling transaction requests delivered between applications and servers via a decentralized architecture. In such concepts, the delivery of transaction requests is controlled in consideration of information regarding groups of transaction requests that may cause transaction collisions if processed in parallel. Such groupings of transaction request may be defined, modified and updated at run-time, based on previous or current observed transaction collisions.

18 Claims, 4 Drawing Sheets

(56) References Cited

U.S. PATENT DOCUMENTS

| | | | |
|---|---|---|---|
| 2018/0121459 A1* | 5/2018 | Sergeev | G06F 16/1744 |
| 2018/0129693 A1 | 5/2018 | Chatterjee et al. | |
| 2018/0322158 A1 | 11/2018 | Zhang et al. | |
| 2019/0392409 A1* | 12/2019 | Mei | G06Q 20/3821 |

OTHER PUBLICATIONS

Github, "Hyperledger Caliper", printed Oct. 10, 2019, 3 pages, https://github.com/hyperledger/caliper.

IBM, "Sequence Groups", IBM Integration Bus, Version 9.0.0.8 Operating Systems: AIX, HP-Itanium, Linux, Solaris, Windows, z/OS, printed Oct. 10, 2019, 3 pages, https://www.ibm.com/support/knowledgecenter/SSMKHH_9.0.0/com.ibm.etools.msgbroker.helphome.doc/help_home_msgbroker.htm.

Marketwatch, "Samsung SDS and IBM Collaborate to Strengthen Open Source Hyperledger Fabric and Blockchain Ecosystems", Published Feb. 14, 2019, 3 pages, https://www.marketwatch.com/press-release/samsung-sds-and-ibm-collaborate-to-strengthen-open-source-hyperledger-fabric-and-blockchain-ecosystems-Feb. 14, 2019.

International Application No. IB2020/061526, entitled "Controlling Transaction Requests Between Applications and Servers", Filed Dec. 4, 2020, 24 pages.

Coleman, et al., "Controlling Transaction Requests Between Applications and Servers," Application and Drawings, Filed on Date, 24 Pages, Related PCT Patent Application U.S. Appl. No. PCT/IB2020/061523.

International Searching Authority, "Notification of Transmittal of the international Search Report and the Written Opinion of the International Searching Authority, or Declaration," Patent Cooperation Treaty, Mar. 15, 2021, 8 pages, International Application No. PCT/1132020/061526.

Munoz-Escoi, et al., "Managing Transaction Conflicts in Middleware-based Database Replication Architectures," 25th IEEE Symposium on Reliable Distributed Systems (SRDS'06), Oct. 2-4, 2006 [accessed on Apr. 1, 2021], 10 pages, IEEE, DOI: 10.1109/Srds.200629, Retrieved from the Internet: <url: https://ieeexplore.ieee.org/stamp/stamp.jsp?tp=&amumber=4032502>.

* cited by examiner

CONTROLLING TRANSACTION REQUESTS BETWEEN APPLICATIONS AND SERVERS

BACKGROUND

The present invention relates generally to the field of communication between applications and servers, and in particular to a middleware system for controlling transaction requests between applications and server.

The present invention also relates to a computer-implemented method for controlling transaction requests between applications and servers.

The present invention also relates to a computer program product comprising computer-readable program code that enables a processor of a system, or a number of processors of a network, to implement such a method.

Enterprise architectures are typically built around integration middleware which is configured to route data to and from various sources and targets, e.g. database management systems, messaging systems and distributed ledger technologies.

Such architecture implementations may employ Multi-Version Concurrency Control (MVCC) which allows simultaneous reads and writes of data, with the requirement that a request to write a piece of data must be accompanied by a hash or version code that represents the current value of the data being overwritten. A request to overwrite data will be rejected (i.e. result in a MVCC failure) if the hash or version code does not match the current value, because that indicates that another connected client is updating the value at the same time. If a client's write request is rejected, the client must retry (e.g. repeat the request), which typically involves reading the current value and sending the write request again. Under heavy load, the ratio of MVCC failures can increase rapidly leading to poor system performance.

SUMMARY

The present invention seeks to provide a middleware system for controlling transaction requests between applications and servers.

The present invention also seeks to provide a method for controlling transaction requests between applications and servers. Such a method may be computer-implemented.

The present invention further seeks to provide a computer program product including computer program code for implementing a proposed method when executed by a processing unit. The present invention also seeks to provide a processing system adapted to execute this computer program code.

According to an aspect of the invention, there is provided a middleware system for controlling transaction requests between applications and servers. The middleware system comprises a broker component. The broker component is configured to, at runtime: define one or more collision groups of transaction requests based on previous or current observed transaction collisions; and control delivery of transaction requests in parallel based on the one or more collision groups.

Proposed are concepts for controlling transaction requests so as to reduce the risk of MVCC collisions. In such concepts, a middleware system may be employed between applications and servers (e.g. between client applications and a blockchain network (or other MVCC constrained backend systems)) and the middleware system may control (e.g. throttle or queue) a flow of transaction requests so that only certain requests are allowed to be submitted in parallel.

For instance, the middleware system may, at runtime, group transaction requests that it observes creating transaction collisions when delivered in parallel. Based on such groups, the middleware system may determine whether transactions should be delivered in parallel.

Embodiments propose that potentially conflicting transaction requests may be arranged into groups, and this may be done dynamically at runtime based on observed collisions. Transaction requests within each group may then be temporarily queued in sequential order until the previous request has been successfully processed and, in the case of blockchain, committed to the ledger. Some embodiments may thus provide a proposal for an integration flow node that may dynamically control request throttling behaviour so as to maximise the throughput of successful transaction submissions.

Proposed embodiments may employ a concept of dynamically creating collision groups based on runtime history of transaction collisions (e.g. MVCC collisions). Also, such dynamic grouping information may be published to other components, nodes or organisations, thereby allowing them to update their group configuration.

According to proposed concepts, a middleware component or system may be provided as an integration flow and placed between a client application and a server. Such an integration flow may form a new 'submitter' or 'broker' node that is configured to control the submission of transaction requests in such a way as to minimise, or potentially eliminate, transaction collisions (e.g. failures).

By way of example, the node may maintain a set of groups (hereinafter referred to as 'collision groups') wherein each transaction request within a group will likely cause a collision of failure if submitted at the same time as any other transaction request within that same group. Then, if more than one transaction request in a group arrives at any one time, the node may throttle the requests by queuing them in a First-In First-Out (FIFO) order until they can be submitted. Each group may operate independently of each other, thereby enabling parallel processing of transaction requests from different groups.

Thus, according to proposed embodiments, there may be provided integration middleware which is configured to dynamically group and throttle transaction requests in a manner which reduces a risk of transaction collision. By dynamically grouping transaction requests based on previous or current observed transaction collisions, information may be provided which is leveraged to control parallel submission of transaction requests.

In particular, proposed concepts may seek to reduce a risk of MVCC collisions by providing middleware (e.g. an integration flow or broker component) between client applications and MVCC constrained backend systems. The middleware throttles transaction requests so that only requests that will not cause an MVCC clash are allowed to be submitted in parallel. Embodiments may leverage the idea to group potentially conflicting transactions (e.g. based on runtime history of MVCC collisions, etc.), and then use such groups to determine if incoming transactions can be submitted in parallel or not. For instance, if more than one transaction request in a group arrives at any one time, they may be queued until they can be safely submitted.

In some embodiments, the broker component may comprise a publisher component configured to communicate information about the one or more collision groups to one or more remote components. In this way, embodiments may be configured to share information with other components, nodes or organisations, such as other broker components, thereby allowing them to update their configuration.

The broker component may comprise a receiver component configured to receive information about at least one of: observed transaction collisions; and further collision groups of transaction requests from a remote component. The broker component may then be configured to, at runtime, define one or more collision groups of transaction requests further based on the received information Embodiments may therefore leverage information from other components, nodes or organisations, such as other broker components, so as to update and improve the collision groups. In this way, embodiments may dynamically adapt and reconfigure to reflect changing conditions and/or parameter in a network or system.

In some embodiments, the broker component may be configured to, responsive to identifying a plurality of transaction requests that are members of the same collision group of the one or more collision groups, queue the plurality of transaction requests so as to prevent parallel delivery of the plurality of transaction requests. For example, the broker component may be configured to queue the plurality of transaction requests in a First-In First-Out order. This may enable the delivery of transaction requests to be controlled, e.g. via postponement or delay, until a later time at which a transaction collision will be avoided/prevented.

The broker component may be configured to, responsive to identifying a transaction collision resulting from delivery of a transaction request, redefine the one or more collision groups of transaction requests based on the identified transaction collision and control redelivery of the transaction request based on the redefined one or more collision groups. Embodiments may therefore be adapted to dynamically reconfigure the delivery of transaction requests. For instance, a transaction request may be redelivered/resubmitted automatically after redefinition of the collision groups, thus avoiding delivery being simply aborted in response to the transaction request causing a collision.

The middleware system may be configured to intercept and control delivery of transaction requests between a client application and a Multi-Version Concurrency Control, MVCC, constrained server. Embodiments may therefore be of particular value to architecture implementations that employ MVCC.

According to another aspect of the invention, there is provided a computer-implemented method for controlling transaction requests between applications and servers. The method comprises: at runtime: defining one or more collision groups of transaction requests based on previous or current observed transaction collisions; and controlling delivery of transaction requests in parallel based on the one or more collision groups.

According to another aspect of the invention, there is provided a computer program product. The computer program product comprises a computer readable storage medium having program instructions embodied therewith, the program instructions executable by a processing unit to cause the processing unit to perform a method according to a proposed embodiment.

According to another aspect of the invention, there is provided a computer system comprising at least one processor and the computer program product according to an embodiment. At least one processor is adapted to execute the computer program code of said computer program product.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
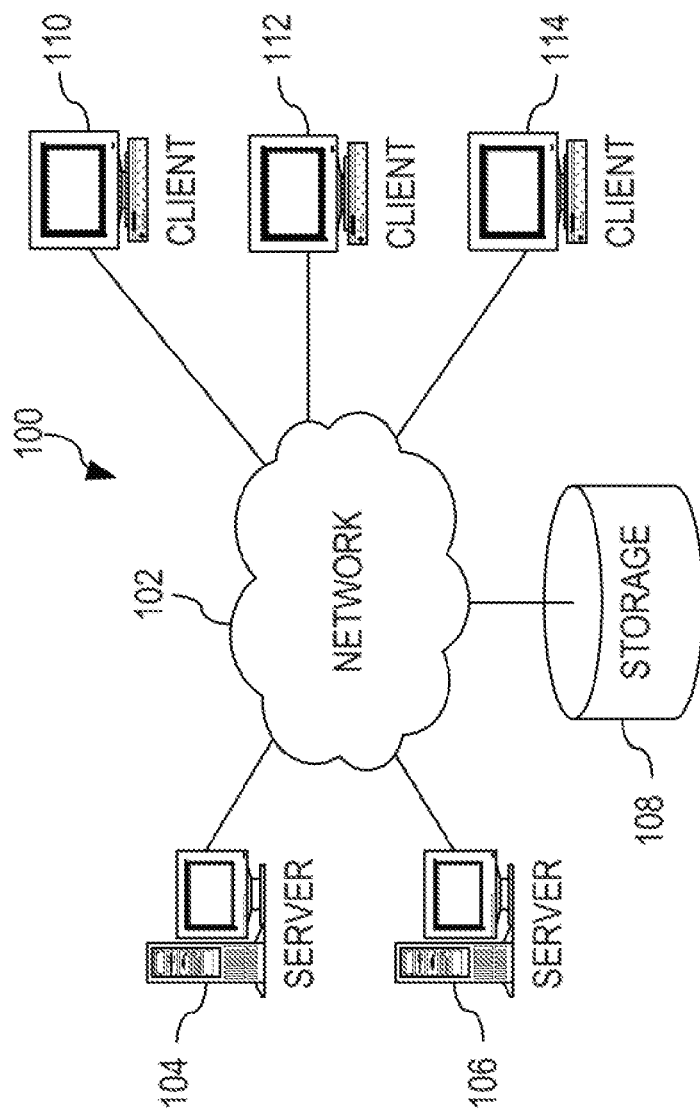
FIG. 1 depicts a pictorial representation of an example distributed system in which aspects of the illustrative embodiments may be implemented.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method may be a process for execution by a computer, i.e. may be a computer-implementable method. The various steps of the method may therefore reflect various parts of a computer program, e.g. various parts of one or more algorithms.

Also, in the context of the present application, a system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention. Further, a component may be an integration flow that is executed by one or more processing units.

Proposed are concepts for controlling transaction requests delivered between applications and servers via a decentralized architecture (i.e. interconnected distributed network). In such concepts, the delivery of transaction requests is controlled in consideration of information regarding groups of transaction requests that may cause transaction collisions if processed in parallel. Such groupings of transaction requests may be defined, modified and updated at run-time, based on previous or current observed transaction collisions.

For instance, it is proposed that potentially conflicting transaction requests may be placed into groups, and this may be done dynamically at runtime based on observed transaction collisions. The defined groups may thus be used to determine whether a plurality of received (or intercepted) transaction requests should be prevented from being processed in parallel. For example, a plurality of transaction requests within the same group may be temporarily queued in a sequential order until the previous request has been successfully processed. In this way, embodiments may dynamically throttle transaction request behaviour so as to reduce or avoid collisions (and thereby seek to maximise the throughput of successful transaction submissions).

In particular, embodiments may be implemented in conjunction with an existing distributed communication architecture that employs integration middleware (e.g. database management systems, messaging systems and distributed ledger technologies).

FIG. 1 depicts a pictorial representation of an exemplary distributed system in which aspects of the illustrative embodiments may be implemented. A distributed system 100 may include a network of computers in which aspects of the illustrative embodiments may be implemented. The distributed system 100 contains at least one network 102, which is the medium used to provide communication links between various devices and computers connected together within the distributed data processing system 100. The network 102 may include connections, such as wire, wireless communication links, or fiber optic cables.

In the depicted example, first 104 and second 106 servers are connected to the network 102 along with a storage unit 108. In addition, clients 110, 112, and 114 are also connected to the network 102. The clients 110, 112, and 114 may be edge devices, for example, personal computers, network computers, IoT devices, or the like. In the depicted example, the first server 104 provides data, such as boot files, operating system images, and applications to the clients 110, 112, and 114. Clients 110, 112, and 114 are clients to the first server 104 in the depicted example. The distributed processing system 100 may include additional servers, clients, and other devices not shown.

In the depicted example, the distributed system 100 is the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

Figure 2:
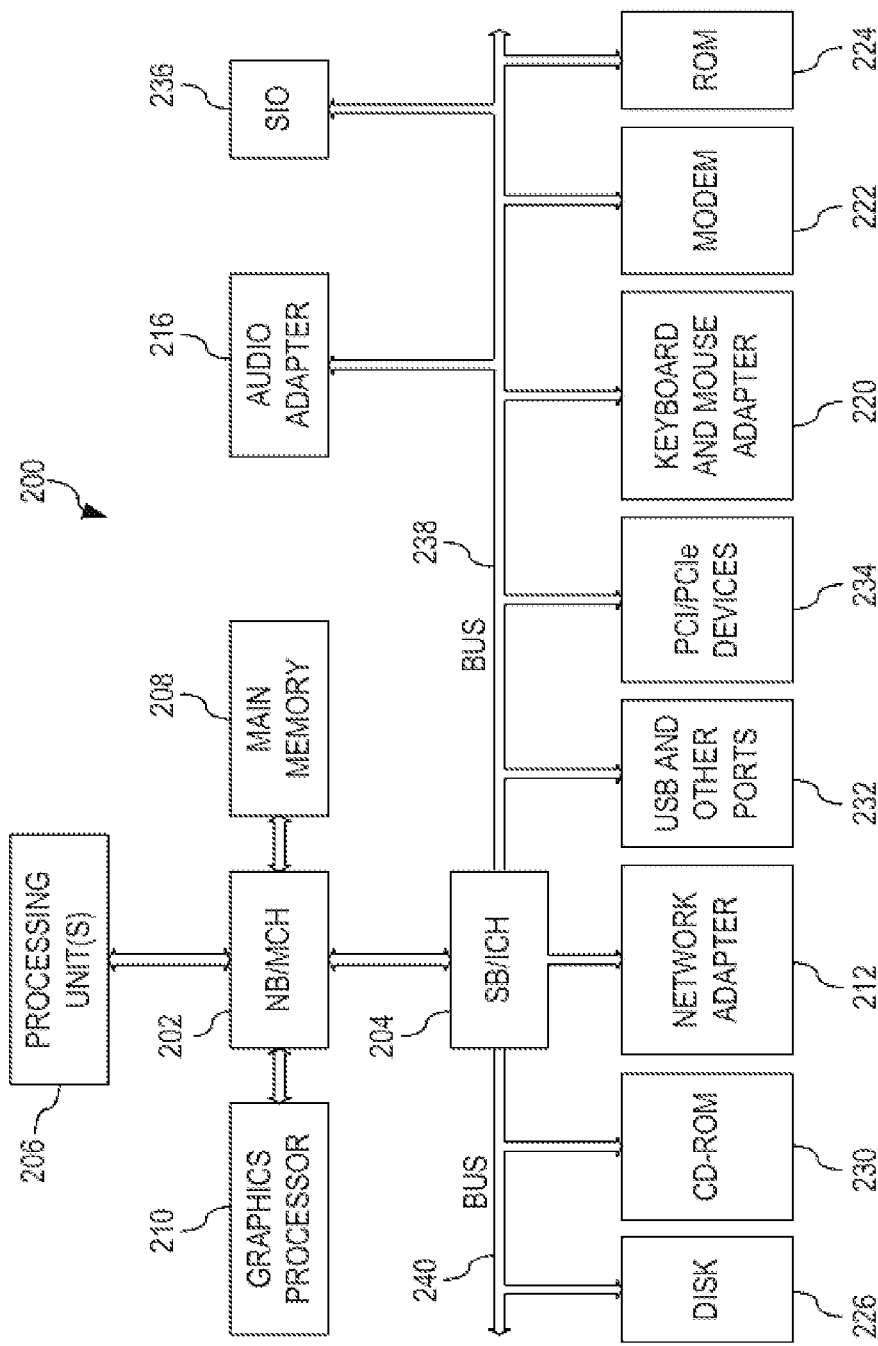
FIG. 2 is a block diagram of an example system in which aspects of the illustrative embodiments may be implemented.

FIG. 2 is a block diagram of an example system 200 in which aspects of the illustrative embodiments may be implemented. The system 200 is an example of a computer, such as client 110 in FIG. 1, in which computer usable code or instructions implementing the processes for illustrative embodiments of the present invention may be located. For instance, a proposed embodiment may be partly implemented in a processing unit 206 of the system 200.

In the depicted example, the system 200 employs a hub architecture including a north bridge and memory controller hub (NB/MCH) 202 and a south bridge and input/output (I/O) controller hub (SB/ICH) 204. Thus, another proposed embodiment may be implemented in the memory controller hub 202 of the system 200. A processing unit 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) port and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or a serial advanced technology attachment (SATA) interface. Super I/O (SIO) device 236 may be connected to SB/ICH 204.

An operating system runs on the processing unit 206. The operating system coordinates and provides control of various components within the system 200 in FIG. 2. As a client, the operating system may be a commercially available operating system. An object-oriented programming system, such as the Java™ programming system, may run in conjunction with the operating system and provides calls to the operating system from Java™ programs or applications executing on system 200.

As a server, system 200 may be, for example, an IBM® eServer™ System p® computer system, running the Advanced Interactive Executive (AIX®) operating system or the LINUX® operating system. The system 200 may be a symmetric multiprocessor (SMP) system including a plurality of processors in processing unit 206. Alternatively, a single processor system may be employed.

Instructions for the operating system, the programming system, and applications or programs are located on storage devices, such as HDD 226, and may be loaded into main memory 208 for execution by processing unit 206. Similarly, one or more programs according to an embodiment may be adapted to be stored by the storage devices and/or the main memory 208.

The processes for illustrative embodiments of the present invention may be performed by processing unit 206 using computer usable program code, which may be located in a memory such as, for example, main memory 208, ROM 224, or in one or more peripheral devices 226 and 230.

A bus system, such as first bus 238 or second bus 240 as shown in FIG. 2, may comprise one or more buses. Of course, the bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the system mentioned previously, without departing from the scope of the present invention.

Moreover, the system 200 may take the form of any of a number of different data processing systems including client computing devices, server computing devices, a tablet computer, laptop computer, telephone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

As detailed above, proposed embodiments provide a method and system for controlling transaction requests delivered between applications and servers via a decentralized architecture. By way of further explanation, a proposed embodiment will now be described with respect to distributed communication system including applications 310 and servers 320.

Figure 3:
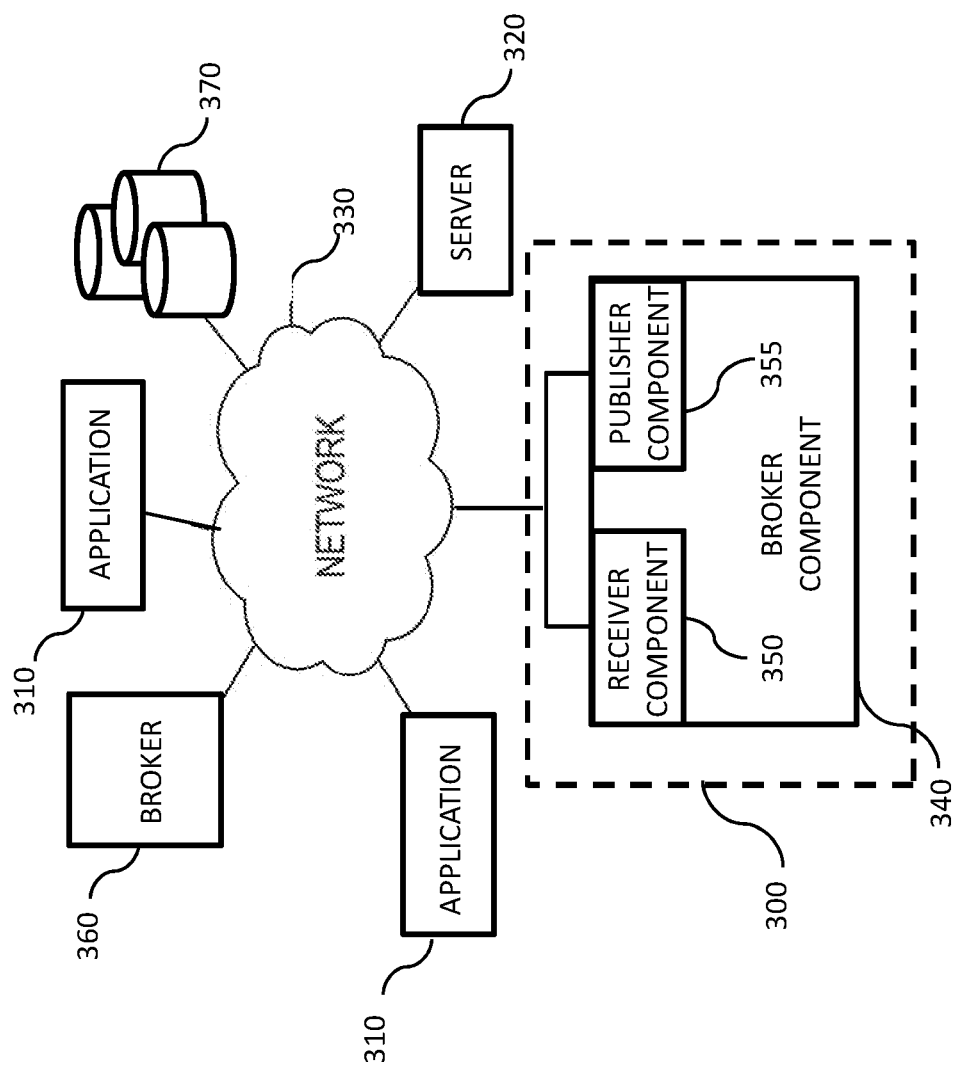
FIG. 3 is a schematic diagram of a proposed distributed communication system according to an embodiment.

Referring to FIG. 3, there is depicted a schematic diagram of a proposed distributed communication system according to an embodiment. The communication system includes a middleware system 300 for controlling transaction requests between applications 310 and servers 320 according to an embodiment. More specifically, in the depicted example of FIG. 3, the middleware system 300 is configured to intercept and control delivery of transaction requests between client applications 310 and a MVCC constrained server 320 via a communication network 330 (e.g. the Internet).

The middleware system 300 comprises a broker component 340. The broker component 340 is configured to, at runtime, define one or more collision groups of transaction requests based on previous or current observed transaction collisions in the distributed communication system. Put another way, the broker component defines collision groups based on a runtime history of transaction collisions.

Here, the broker component 340 defines the groups such that each of the collision groups defines a plurality of transaction requests that, if delivered in parallel, will result in a transaction collision.

In this example, the broker component 340 includes a receiver component 350 that is configured to receive information about observed transaction collisions in the communication system and/or further collision groups of transaction requests from a remote component (such as another broker component 360). The broker component 340 also employs this received information to define the collision groups. Thus, in the depicted example of FIG. 3, the broker component is configured to, at runtime, define the collision groups of transaction requests further based on the received information.

The broker component 340 also comprises a publisher component 355 that is configured to communicate information (via the network 330) about the defined collision groups to one or more remote components (such as another broker 360 and/or a remotely located database 370). In this way, the broker component 340 is configured to share information about collision groups, thus potentially enabling multiple broker components to collaborate (e.g. combine or pool information) in order to update and/or improve collision group definitions.

Based on the collision groups, the broker component 340 is configured to control delivery of intercepted transaction requests. More specifically, responsive to identifying that a plurality of intercepted transaction requests are members of the same collision group, the broker component 340 queues the plurality of transaction requests so as to prevent parallel delivery of the plurality of transaction requests. For instance, the broker component 340 may queue the plurality of transaction requests in a First-In First-Out order. In this way, where the first and second transaction requests are members of the same collision group, the broker component 340 may delay a first transaction request and prevent it from being submitted in parallel with the second transaction request.

Also, in this example, responsive to identifying a transaction collision resulting from delivery of a transaction request, the broker component 340 is configured to redefine the collision groups based on the identified transaction collision. Further, rather than aborting the transaction request, the broker component 340 controls redelivery of the transaction request based on the newly redefined collision groups.

By way of further explanation and illustration of the proposed concepts, we will now consider how proposed embodiments may alter conventional transaction request delivery mechanisms. A conventional mechanism for submitting a transaction request to a blockchain network typically requires the following multistep process to be invoked:

(i) Create a transaction request—This is a data structure that comprises the function to be invoked in the blockchain network and the paramters/arguments to be supplied to that function.

(ii) Send the transaction request to each node in the blockchain network for 'endorsement'—Each node's smart contract will simulate the processing of that function, and generate a read/write set (RWset). This RWset contains the current state and the proposed future state of the relevant part of the ledgers data store for each node in the blockchain network. The RWset it not actually applied at this stage, but rather returned to the requesting client.

(iii) The client groups together the RWsets received from each node and sends to the blockchain's 'ordering service'. This service will perform the following steps:
  a) Check that all of the RWsets (or enough of them to satisfy the endorsement policy) have identical RWsets. At this stage, the transaction request can be rejected if they differ, because one node could have a different read state to the others showing that that particular state is in the process of being changed in the network (MVCC failure);
  b) If step a) passes, the ordering service creates a block which contains a batch of one or more transactions. This block is cryptographically signed and sent to each peer in the network;
  c) Each peer, on receipt of the block, attempts to apply each transaction to its ledger. For each transaction in the block, it checks that the 'read' part of the RWset matches the current read state of its ledger. If they do not match, the transaction is rejected as an MVCC failure. It is noted that the action of the ordering service ensures that all nodes in the network will either accept or reject the transaction in the same way; and
  d) Assuming no MVCC failures have occurred, the transaction has now been committed to the blockchain network.

Step (iii) detailed above is asynchronous. If the client wants to be notified when the transaction has finally been committed to the ledger, the client registers a listener to the peer(s) in order to receive notifications of events.

When considering how the abovementioned conventional approach is modified according to proposed embodiments, it noted that a middleware component (e.g. an integration flow) is placed between the client application and the blockchain network. This is configured to operate as a new broker component (that may be thought of as a 'submitter' node) that controls the submission of transaction requests to the blockchain in such a way as to minimise, or potentially eliminate, MVCC failures.

The broker component maintains information about a set of distinct collision groups, where each transaction request within a group will likely cause an MVCC failure if submitted at the same time as any other transaction request within that same group. Based on these collision groups, if more than one transaction request of the same group arrives at once (e.g. at the same time or within a predetermined time window), the broker component delays those transaction requests (e.g. by queueing the transactions request) until they can be submitted without causing a MVCC collision. The collision groups may operate independently of each other, thus allowing parallel processing of transaction requests from different groups.

By way of further example, a broker component according to an embodiment may be configured to operate as follows:

- A 'collision group definition' property is configured with an expression that determines, at runtime, which group each transaction request should be a member of. This could be an expression which uses the content of the transaction request to derive a string value that matches the collision group name
- A flag can be set to allow the broker component to dynamically combine groups if, at runtime, it determines that proposals from different groups are causing MVCC failures.
- At runtime, the broker component can implement the following process:
- For each transaction request arriving at the broker component, the collision group definition expression is evaluated to determine which named collision group it should be placed in. If a collision group of that name doesn't exist, then it is created.
- The transaction request is placed into a FIFO queue associated with that collision group.
- Each collision group can then implement the following process (in parallel and independent of each other collision group).
- If the queue is not empty, then a transaction request is removed from the head of the queue.
- Steps 1 & 2 in the conventional blockchain submission process is performed as detailed above.
- A commit listener is registered with the blockchain peers.
- Step 3 in the blockchain submission process is performed.
- Wait for a commit event.
- Once a successful commit event has been received, this process can start from the beginning (process the next proposal on the group's queue).
- If the commit event signals an MVCC failure, then determine the cause of the failure and, if it's an MVCC failure, determine which other transaction request caused the clash, and which group that other transaction request belonged to. This information can be extracted from the block metadata.
  - If it's a different group, merge the two groups into one, and move this transaction request to the newly merged group for processing. Also publish a message containing information of this group merge so that other broker component instances could choose to act on this information.
  - Otherwise, repeat the submission of the failed transaction request by repeating this process until it is successfully processed (this is because MVCC failures could still occur if there are other client applications submitting transactions directly rather than via this integration flow).

Figure 4:
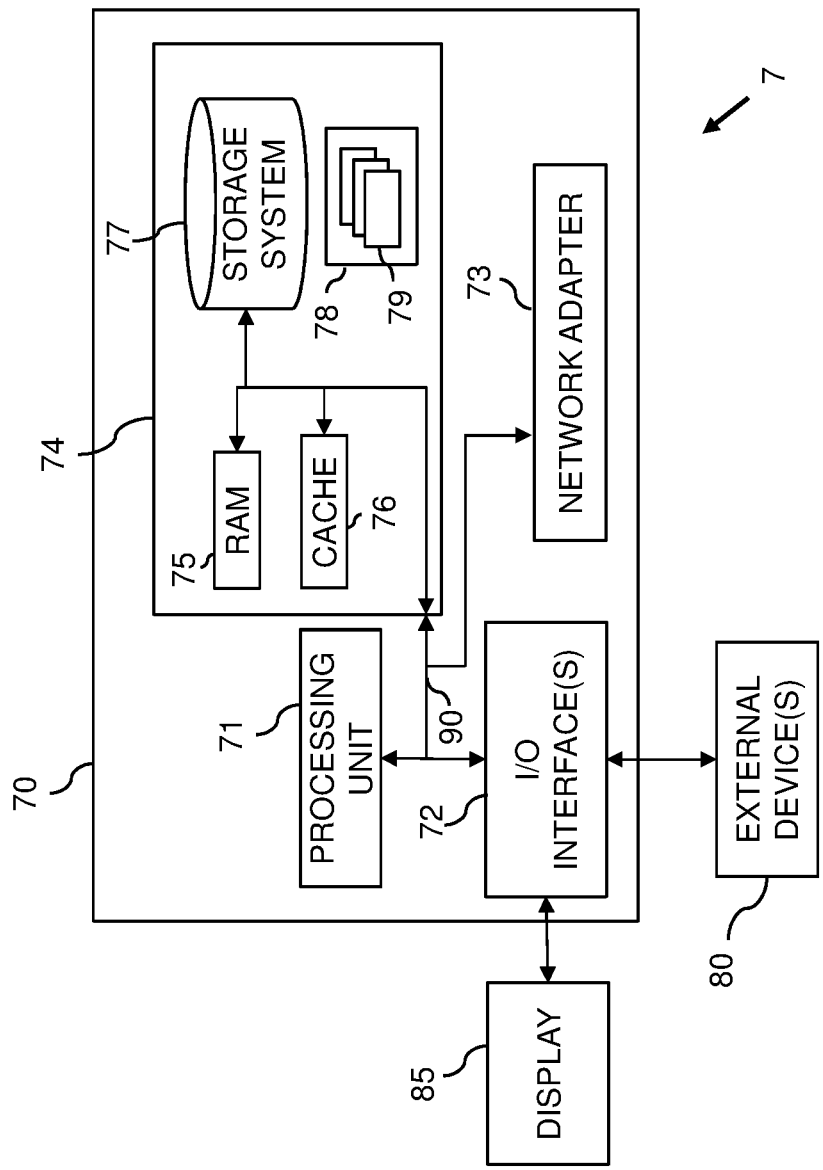
FIG. 4 illustrates a system according to another embodiment.

Embodiments may comprise a computer system 70, which may form part of a networked system 7 illustrated in FIG. 4. For instance, a broker component configured to control transaction requests between applications and servers according to an embodiment may be implemented in the computer system 70 (e.g. as a processing unit 71). The components of computer system/server 70 may include, but are not limited to, one or more processing arrangements, for example comprising processors or processing units 71, a system memory 74, and a bus 90 that couples various system components including system memory 74 to processing unit 71.

System memory 74 can include computer system readable media in the form of volatile memory, such as random access memory (RAM) 75 and/or cache memory 76. Computer system/server 70 may further include other removable/non-removable, volatile/non-volatile computer system storage media. In such instances, each can be connected to bus 90 by one or more data media interfaces. The memory 74 may include at least one program product having a set (e.g., at least one) of program modules that are configured to carry out the functions of proposed embodiments. For instance, the memory 74 may include a computer program product having program executable by the processing unit 71 to cause the Input/Output (I/O) interface 72 perform a method for controlling transaction requests between applications and servers according to a proposed embodiment. Program/utility 78, having a set (at least one) of program modules 79, may be stored in memory 74. Program modules 79 generally carry out the functions and/or methodologies of proposed embodiments for partial write operations to memory.

Computer system/server 70 may also communicate with one or more external devices 80 such as a keyboard, a pointing device, a display 85, etc.; one or more devices that enable a user to interact with computer system/server 70; and/or any devices (e.g., network card, modem, etc.) that enable computer system/server 70 to communicate with one or more other computing devices. Such communication can occur via Input/Output (I/O) interfaces 72. Still yet, computer system/server 70 can communicate with one or more networks such as a local area network (LAN), a general wide area network (WAN), and/or a public network (e.g., the Internet) via network adapter 73 (e.g. to communicate determined optimal values of DFWF to edge devices of a distributed network).

In the context of the present application, where embodiments of the present invention constitute a method, it should be understood that such a method is a process for execution by a computer, i.e. is a computer-implementable method. The steps of the method therefore reflect various parts of a computer program, e.g. parts of one or more algorithms.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A middleware computer system for controlling transaction requests between applications and servers, the middleware system comprising:
   a broker component configured to, at runtime:
      define one or more collision groups of transaction requests based on previous or current observed transaction collisions; and
      control delivery of transaction requests in parallel based on the one or more collision groups,
   wherein the broker component comprises a receiver component configured to receive information about at least one of:
      observed transaction collisions; and
      further collision groups of transaction requests from a remote component, and wherein the broker component is configured to, at runtime, define one or more collision groups of transaction requests further based on the received information.

2. The middleware computer system of claim 1, wherein each of the one or more collision groups defines a plurality of transaction requests that if delivered in parallel will result in a transaction collision.

3. The middleware computer system of claim 1, wherein the broker component comprises a publisher component configured to communicate information about the one or more collision groups to one or more remote components.

4. The middleware computer system of claim 1, wherein the broker component is configured to, responsive to identifying a plurality of transaction requests that are members of the same collision group of the one or more collision groups, queue the plurality of transaction requests to prevent parallel delivery of the plurality of transaction requests.

5. The middleware computer system of claim 4, wherein the broker component is configured to queue the plurality of transaction requests in a first-in first-out order.

6. The middleware computer system of claim 1, Wherein the broker component is configured to, responsive to identifying a transaction collision resulting from delivery of a transaction request, redefine the one or more collision groups of transaction requests based on the identified transaction collision and control redelivery of the transaction request based on the redefined one or more collision groups.

7. The middleware computer system of claim 1, wherein the middleware system is configured to intercept and control delivery of transaction requests between a client application and a Multi-Version Concurrency Control, MVCC, constrained server.

8. A processor-implemented method for controlling transaction requests between applications and servers, the method comprising:
    defining, at runtime, one or more collision groups of transaction requests based on previous or current observed transaction collisions;
    controlling delivery of transaction requests in parallel based on the one or more collision groups; and
    receiving information about at least one of: observed transaction collisions; and further collision groups of transaction requests from a remote component,
    wherein defining one or more collision groups of transaction requests is further based on the received information.

9. The method of claim 8, wherein each of the one or more collision groups defines a plurality of transaction requests that if delivered in parallel will result in a transaction collision.

10. The method of claim 8, further comprising:
    communicating information about the one or more collision groups to one or more remote components.

11. The method of claim 8, further comprising:
    responsive to identifying a plurality of transaction requests that are members of the same collision group of the one or more collision groups, queuing the plurality of transaction requests to prevent parallel delivery of the plurality of transaction requests.

12. The method of claim 11, wherein queuing the plurality of transaction requests comprises queuing the plurality of transaction requests in a first-in first-out order.

13. The method of claim 8; further comprising:
    responsive to identifying a transaction collision resulting from delivery of a transaction request, redefining the one or more collision groups of transaction requests based on the identified, transaction collision; and
    controlling redelivery of the transaction request based on the redefined one or more collision groups.

14. The method of claim 8, wherein the method is configured to intercept and control delivery of transaction requests between a client application and a Multi-Version Concurrency Control (MVCC) constrained server.

15. A computer program product comprising a computer-readable tangible storage medium having program instructions embodied therewith, the program instructions executable by a processing unit to cause the processing unit to perform, when run on a computer network, a method for controlling transaction requests between applications and servers, wherein the method comprises the steps of:
    at runtime: defining, by a broker component, one or more collision groups of transaction requests based on previous or current observed transaction collisions; and
    controlling delivery of transaction requests in parallel based on the one or more collision groups,
    wherein the broker component comprises a receiver component configured to receive information about at least one of:
    observed transaction collisions; and
    further collision groups of transaction requests from a remote component, and wherein the broker component is configured to, at runtime, define one or more collision groups of transaction requests further based on the received information.

16. A computer system comprising at least one processor and the computer program product of claim 15, wherein the at least one processor is adapted to execute the computer program code of said computer program product.

17. The computer program product of claim 15, wherein each of the one or more collision groups defines a plurality of transaction requests that if delivered in parallel will result in a transaction collision.

18. The computer program product of claim 15, further comprising:
    communicating information about the one or more collision groups to one or more remote components.

* * * * *